May 10, 1955
E. L. CLINE
2,707,877
CHASSIS DYNAMOMETER FRAME SUPPORTS
Original Filed May 20, 1942
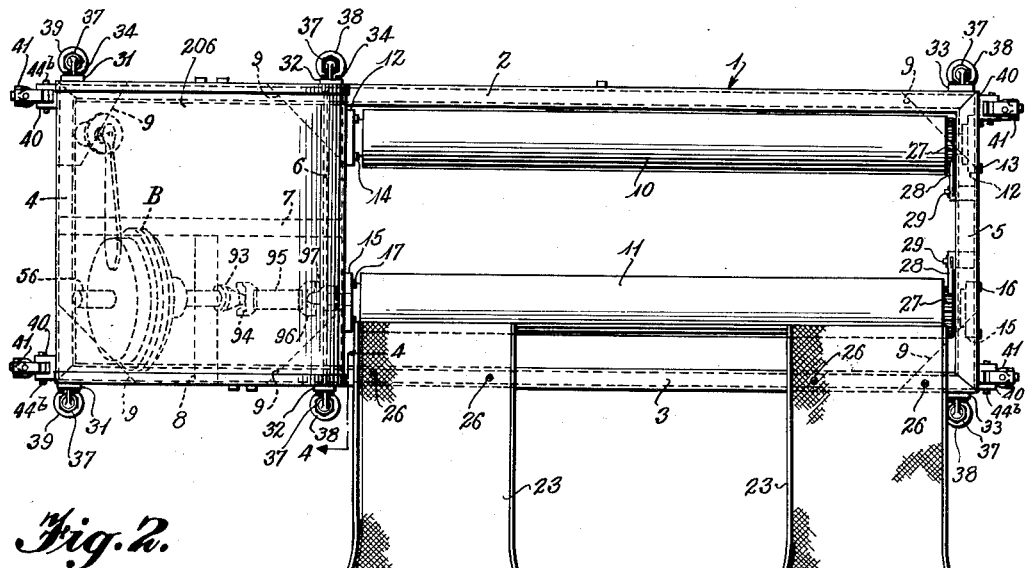
Fig. 1.
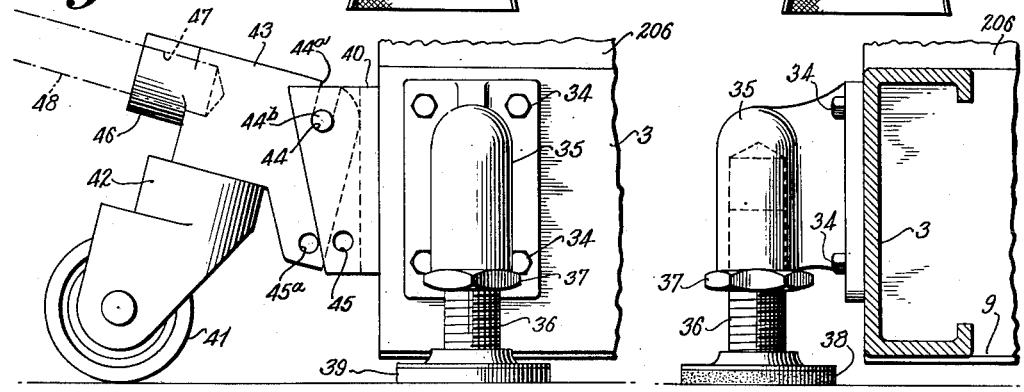
Fig. 2.
Fig. 4.
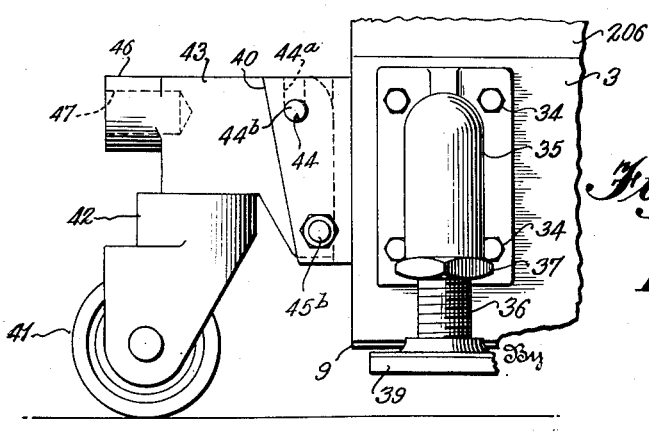
Fig. 3.
Inventor
Edwin L. Cline
Bacon + Thomas
Attorneys United States Patent Office 2,707,877
Patented May 10, 1955

2,707,877

CHASSIS DYNAMOMETER FRAME SUPPORTS

Edwin L. Cline, Pasadena, Calif., assignor to Clayton Manufacturing Company, El Monte, Calif., a corporation of California Original application May 20, 1942, Serial No. 443,833. Divided and this application September 24, 1947, Serial No. 775,767

10 Claims. (Cl. 73—117)

The present invention relates to a portable chassis dynamometer, and more particularly to a novel retractable caster construction and cooperating arrangement of supporting feet especially useful in connection with a dynamometer of the character disclosed in my copending application Serial No. 443,833, filed May 20, 1942, now Patent 2,452,550, granted November 2, 1948, and of which the instant application is a division.

The principal object of the invention is to provide means selectively useful for rendering a chassis dynamometer portable when portability is desired, and for rigidly supporting the dynamometer during a test when the latter is desired.

Another object of the invention is to provide a dynamometer frame with means for rendering the same stable and for absorbing the vibration thereof to insure quiet operation.

Another object of the invention is to provide supporting means for a dynamometer frame that can be easily adjusted to maintain the frame level, notwithstanding unevenness in the surface of a supporting floor.

A further object of the invention is to provide a retractable caster and bracket construction adapted for use with dynamometer frames and the like, whereby such frames can be elevated from the floor at will by means of the casters to enable the same to be rolled from one place to another.

A still further object of the invention is to provide a caster construction that can be moved from a retracted or inactive position to an active or advanced position with a minimum of physical effort.

Another object of the invention is to provide a caster and bracket construction wherein the caster can be readily attached or detached from the bracket, as desired.

Still another object of the invention is to provide a caster and bracket construction wherein the caster can be moved about a fixed fulcrum from a retracted to an advanced position and then locked against further pivotal movement.

Other objects of the invention will be apparent from the following description taken in conjunction with the accompanying drawings, in which:

Fig. 1 is a plan view of a chassis dynamometer equipped with casters and feet embodying the principles of the present invention;

Fig. 2 is an elevational view of one of the casters in its retracted position;

Fig. 3 is a view illustrating the caster of Fig. 2 in its advanced position and supporting the dynamometer frame in a position raised from the floor; and Fig. 4 is a sectional view showing a supporting foot, taken on the line 4—4 of Fig. 1.

Referring now to Fig. 1 of the drawings, the portable chassis dynamometer frame is substantially rectangular and is generally identified by the numeral 1. The frame 1 comprises longitudinally extending side members 2 and 3 spaced apart and interconnected by transverse end members 4 and 5 and an intermediate transverse member 6. All of the members 2 to 6 are preferably made of structural steel, generally C-shaped in cross-section, as shown, for example, in Fig. 4. The transverse members 4 and 6 are connected by a longitudinally extending section 7, and the section 7 is connected to the side member 3 by a short transverse member 8. The frame 1, as a whole, is stiffened by six gusset plates 9, respectively, positioned on the underside of the frame at each corner thereof and adjacent the transverse member 6. The parts 2 to 9, inclusive, are preferably welded together and provide a very rigid frame structure.

A pair of dynamometer rolls 10 and 11 is mounted horizontally within the frame 1 between the transverse members 5 and 6. The rolls 10 and 11 are of a length sufficient to be engaged by both rear wheels of a motor vehicle, whereby the natural frequency of vibration of the rolls is reduced somewhat, thus avoiding resonance. The rolls 10 and 11 are also balanced to avoid dynamic vibration during rotation. The roll 10 is an idler and is supported at its opposite ends in bearing blocks 12, one of which is secured to the end member 5 by bolts 13 and the other of which is secured to the intermediate transverse member 6 by bolts 14. The roll 11 serves as a driver or power takeoff for transmitting the power from the rear wheels of a motor vehicle to the brake unit of the dynamometer B contained within a housing 206. The roll 11 is mounted in bearing blocks 15 similar to the bearing blocks 12. One of the bearing blocks 15 is secured to the member 5 by bolts 16 and the other bearing block is secured to the intermediate transverse member 6 by bolts 17. The brake unit B has a shaft 56 which is connected with one end of the roll 11 by an intermediate shaft 95 and a pair of universal joints comprising parts 93—94 and 96—97.

A pair of ramp members 23 is provided to enable a vehicle to be backed onto the rolls 10 and 11 for test purposes. The ramps 23 are maintained in operative relation to the side member 3 by means of removable screws 26 which enable the ramps to be readily detached when desired. A ratchet wheel 27 is secured to each roll 10 and 11 and cooperating pawls 28 are mounted upon pins 29 carried by the transverse member 5 so that either roll can be locked against rotation to aid in driving a vehicle off said rolls.

In view of the possibility that the floor surface upon which the portable dynamometer is to be used may not be level, the frame 1 carries three pairs of adjustable feet, one pair being secured to the frame members 2 and 3 adjacent each of the ends of the rolls 10 and 11 and a third pair being secured at an intermediate point adjacent the left extremity of the frame. Each pair of feet is associated with a pair of brackets 31, 32, and 33 secured to the side members 2 and 3 of the frame 1 by bolts 34. Each of the brackets includes a vertically extending internally threaded arm 35. A threaded stem 36 is carried by each of the arms 35 and is vertically adjustable therein. A jamb nut 37 serves to lock the stem 36 in the desired position of adjustment relative to the arm 35. The stem 36 associated with the pairs of brackets 32 and 33 is provided with a rubber pad 38 adapted to engage the floor and serve to prevent vibration noises. In contrast, the pair of brackets 31 has the metal head 39 of the stem 36 directly engaged with the ground to serve as stabilizing feet for the brake end of the dynamometer. These feet make unyielding contact with the floor and overcome any tendency for the frame to shift relative to the floor while in use.

The end frame members 4 and 5 of the frame 1 each carry a pair of U-shaped brackets 40 to receive retractable casters 41. These casters are of the swivel type and include a yoke 42 pivotally connected to an arm or extension 43. Each bracket 40 has a flat base portion engaged with its associated frame member 4 or 5 and a pair of spaced arms extending at right angles therefrom and provided with aligned pin holes 44, and the extension 43 has an open slot 44ᵃ formed in the upper surface thereof so that it can be easily slipped under a fulcrum pin 44ᵇ, said pin being preferably permanently secured to said bracket, as by welding. The bracket 40 also has aligned bolt holes 45 and the arm 43 has a bolt hole 45ᵃ for the reception of a bolt 45ᵇ. The distance of the slot 44ᵃ from the hole 45ᵃ is equal to the spacing of the holes 44 and 45, so that the latter holes can be readily aligned to receive the bolts 45ᵃ to lock the arms 43 to their associated brackets. The arm 43 has a boss 46 provided with a hole or recess 47 adapted to receive one end of a bar 48 shown in dot-and-dash lines in Fig. 2.

When it is desired to elevate the frame 1 of the dynamometer so as to permit movement thereof from one location to another on the casters 41, the arm 43 is slipped into place under the fulcrum pin 44ᵇ with the slot 44ᵃ engaging said pin. One end of the bar 48 is inserted into the hole 47 and force is exerted upon the other end of the bar 48 to cause the arm 43 to pivot about the pin 44ᵇ. As will be apparent from Fig. 2, this will cause the frame 1 to be lifted from the floor and to rest upon the caster 41. The bolt apertures 45ᵃ of the arm 43 eventually become aligned with the bolt openings 45 in the bracket 40 so that by passing the bolt 45ᵇ through these openings, the caster 41 can be retained in its advanced position shown in Figs. 1 and 3 and the bar 48 then removed. When all of the casters 41 are in their advanced position, the dynamometer frame 1 can readily be shifted to any desired position on the floor or be readily rolled onto a trailer or other conveyance for transportation to distant points.

When the dynamometer is to be set up for use, the casters 41 can be quickly retracted by removing the bolts 45ᵇ so that the feet of the frame 1 will rest upon the floor. When the frame is in use, it is preferable to have the same substantially level with the lowermost portion thereof spaced at least a quarter of an inch above the floor. To this end, the metal feet 39 and the rubber feet 38 at the opposite ends of the frame 1 are preferably first adjusted so that they project about a quarter of an inch below the frame and then the casters 41 are retracted. A level may be used at the respective ends of the frame and the feet adjusted until the frame is substantially horizontal, irrespective of any irregularities in the floor. After the feet at the ends of the frame 1 have been properly adjusted, the intermediate feet are next adjusted to a point where they engage the floor. It will be recalled that these intermediate feet carry rubber pads 38. In making this adjustment, the stem 36 is unscrewed from the bracket 32 until the rubber pad 38 rests on the floor tightly enough to be turned back and forth slightly against the friction or elasticity of the rubber. When all of the feet have been properly adjusted, the jamb or lock nuts 37 are tightened against the arms 35 so that the feet remain locked in the desired adjusted position. The bar 48, obviously, can be employed to aid in adjusting the feet of the frame by advancing the casters 41 slightly to take the weight off the corner feet during the adjustment of said feet to level the frame 1. After the frame has been adjusted, the casters can be easily removed by disengaging the slot 44ᵃ from the pin 44ᵇ. Thus, means is provided for easily and quickly setting up the dynamometer unit with the rolls 10 and 11 on a true horizontal axis.

Once the dynamometer apparatus has been set up, the vehicle to be tested can be backed up the ramps 23 and over the roll 11 so that the rear wheels of the vehicle become cradled between the rolls 10 and 11. The vehicle can then be subjected to any test desired and the torque developed thereby absorbed by the brake unit B.

It will be understood that various changes may be made in the details of construction and arrangement of the parts shown herein without departing from the principles of the invention or the scope of the appended claims.

I claim:

1. In a retractable caster and bracket construction: a U-shaped bracket having a flat base portion adapted to engage a flat supporting surface and spaced arms extending at right angles from said base portion; a caster construction including a yoke member and a wheel carried by said yoke member; means permanently mounted upon said arms and spaced from said base connecting said yoke member with the arms of said bracket, said yoke member having a portion thereof disposed between said means and said base, said means providing for pivotal movement of said yoke member relative to said bracket; and means for securing said yoke member in non-pivoting relation to said arms of said bracket when said yoke member is in its advanced position.

2. In a retractable caster and bracket construction: a U-shaped bracket having a flat base portion adapted to engage a flat supporting surface and spaced arms extending at right angles from said base portion; a caster construction including a yoke member and a wheel carried by said yoke member; means including a pin permanently mounted upon said arms and spaced from said base detachably connecting said yoke member with the arms of said bracket, said yoke member having a portion thereof disposed between said pin and said base, said pin providing a fulcrum for pivotal movement of said yoke member relative to said bracket; and means for securing said yoke member in non-pivoting relation to said arms of said bracket when said yoke member is in its advanced position.

3. In a retractable caster and bracket construction: a U-shaped bracket having opposed arms; a caster construction including a yoke member and a wheel carried by said yoke member; a fulcrum pin carried by said arms, said yoke member having an extension disposed between said bracket arms, said extension having an upper surface and an open slot extending inwardly from said upper surface to receive said fulcrum pin to provide for pivotal movement of said yoke member relative to said bracket; and means for securing said yoke member in non-pivoting relation to said bracket when said yoke member is in its advanced position.

4. A portable chassis dynamometer, comprising: a substantially rectangular frame; a pair of spaced, parallel rolls rotatably supported longitudinally in said frame and adapted to be engaged by the wheels of a vehicle undergoing test; a hydraulic brake unit arranged at one end of said rolls; means drivingly connecting one of said rolls with said brake unit; and adjustable feet secured to said frame adjacent each corner and at a point on each side thereof intermediate said brake unit and rolls, whereby to support said frame, rolls and brake unit in spaced relation to a floor, the feet nearest the opposite ends of said rolls being provided with rubber pads to prevent vibration noises, and the feet at the brake unit end of the frame having metal surfaces for direct engagement with the floor to serve as stabilizers to overcome any tendency of said frame to shift relative to said floor while in use.

5. A portable chassis dynamometer, comprising: a substantially rectangular frame; a pair of spaced, parallel rolls rotatably supported longitudinally in said frame and adapted to be engaged by the wheels of a vehicle undergoing test; a hydraulic brake unit arranged at one end of said rolls; means drivingly connecting one of said rolls with said brake unit; retractable casters mounted at each of the corners of said frame for maintaining said frame spaced from a floor; and adjustable feet secured to said frame adjacent each corner and at a point on each side thereof intermediate said brake unit and rolls, whereby to support said frame, rolls and brake unit in spaced relation to a floor upon retraction of said casters, the feet nearest the opposite ends of said rolls being provided with rubber pads to prevent vibration noises, and the feet at the brake unit end of the frame having metal surfaces for direct engagement with the floor to overcome any tendency of said frame to shift relative to said floor while in use.

6. Frame supporting means, comprising: a U-shaped bracket including a base and a pair of spaced arms, each of said arms having a pin aperture spaced from said base and a bolt aperture spaced from said base and also spaced a given distance from the pin aperture, with the pin and bolt apertures in the respective arms in alignment and with the pin apertures arranged above the bolt apertures; a caster construction including a yoke member and a wheel carried by said yoke member, said yoke member having an extension including an upper surface and being provided with an open slot extending inwardly thereinto from said upper surface and having a bolt aperture spaced from said slot substantially the same distance as the space between the pin and bolt apertures of said bracket; a pin extending through the pin apertures of said bracket and receivable in said open slot for pivotally connecting said yoke member with said bracket, whereby to detachably secure said yoke member to said bracket; and a bolt adapted to be extended through said bolt apertures of said bracket and yoke extension for maintaining said yoke member in its advanced position, said yoke member having a hole adapted to receive one end of a bar to which force may be applied to cause said yoke member to pivot about said pin and align said bolt apertures for the reception of said bolt.

7. A detachable caster device, comprising: a bracket having a base and parallel arms extending from said base; a fulcrum pin carried by said arms and spaced from said base; a caster construction including a yoke member and a caster wheel carried by said yoke member, said yoke member having a hook portion detachably engageable with the lower side of said fulcrum pin for pivotal movement about said fulcrum pin during movement of said yoke member from a retracted position to an advanced position said yoke member including a portion engageable with said bracket to limit movement thereof to said advanced position; and means for locking said yoke member in advanced position.

8. In a retractable caster and bracket construction: a U-shaped bracket having a base and spaced arms extending from said base; a caster construction including a yoke member and a caster wheel carried by said yoke member; means including a pin permanently mounted upon said arms and spaced from said base connecting said yoke member with the arms of said bracket for pivotal movement of said yoke member relative to said bracket, said yoke member including a portion disposed between said pin and said base, said arms and yoke member having openings which are aligned when said yoke member is in advanced position; and means insertable in said aligned openings to retain said yoke member in advanced position.

9. In a retractable caster and bracket construction: a U-shaped bracket having a base and spaced arms extending from said base; a caster construction including a yoke member and a caster wheel carried by said yoke member; means carried by said arms and spaced from said base connecting said yoke member with the arms of said bracket for pivotal movement of said yoke member relative to said bracket, said arms and yoke member having openings which are aligned when said yoke member is in advanced position; and means insertable in said aligned openings to retain said yoke member in advanced position, said yoke member having a laterally extending boss provided with a recess adapted to receive one end of a handle for moving said yoke member from a retracted position to an advanced position and vice versa.

10. In a retractable caster and bracket construction: a U-shaped bracket having a base and opposed arms extending from said base; a caster construction including a yoke member and a wheel carried by said yoke member; a fulcrum pin carried by said arms in spaced relation to said base, said yoke member having an extension disposed between said bracket arms, said extension having an upper surface and an open slot extending inwardly from said upper surface to receive said fulcrum pin to provide for pivotal movement of said yoke member relative to said bracket, said arms and yoke member having openings which are aligned when said yoke member is in advanced position; and means insertable in said aligned openings to retain said yoke member in advanced position.

References Cited in the file of this patent

UNITED STATES PATENTS

| Number | Name | Date |
|---|---|---|
| Re. 14,964 | Anderson | Oct. 26, 1920 |
| 771,654 | Meek | Oct. 4, 1904 |
| 814,562 | Peters | Mar. 6, 1906 |
| 894,949 | Hendricks | Aug. 4, 1908 |
| 976,705 | Spellman | Nov. 22, 1910 |
| 1,000,163 | Ellis | Aug. 8, 1911 |
| 1,107,619 | Kuhner | Aug. 18, 1914 |
| 1,155,126 | Bond | Sept. 28, 1915 |
| 1,484,622 | Claus | Feb. 26, 1924 |
| 1,650,504 | Frost | Nov. 22, 1927 |
| 1,667,267 | Pitcher | Apr. 24, 1928 |
| 1,863,369 | Frappier | June 14, 1932 |
| 1,958,390 | Graham | May 8, 1934 |
| 1,999,106 | Muller | Apr. 23, 1935 |
| 2,130,900 | Presbrey | Sept. 20, 1938 |
| 2,359,016 | Wood | Sept. 26, 1944 |
| 2,460,094 | Little | Jan. 25, 1949 |